United States Patent Office 2,922,581
Patented Jan. 26, 1960

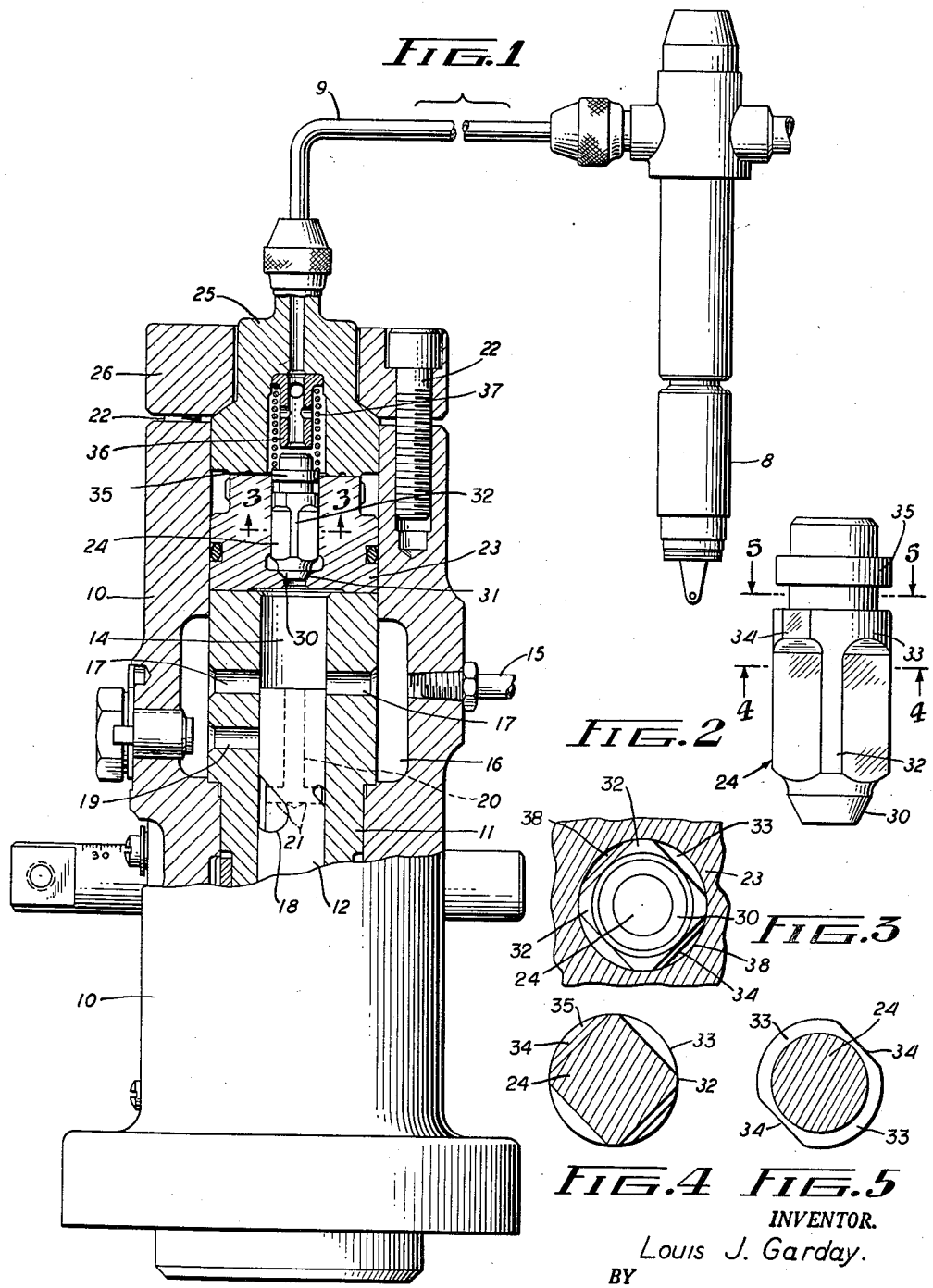

2,922,581

FUEL INJECTION APPARATUS

Louis J. Garday, Sidney, N.Y., assignor to Bendix Aviation Corporation, Sidney, N.Y., a corporation of Delaware Application June 14, 1954, Serial No. 436,310

14 Claims. (Cl. 239—5)

This invention relates to fuel injection apparatus and more particularly to means for controlling the intermittent flow of liquid fuel from the pressure chamber of a pump or the like to a combustion chamber or the like.

Modern diesel or solid fuel injection type engines are equipped with high pressure pumps, usually of the reciprocating plunger type, which pump liquid fuel through a delivery line and a pressure loaded spray nozzle valve into a combustion chamber. Communication between the pump chamber and the delivery line is controlled by a valve commonly known as a delivery valve, one of the functions of this valve being to maintain a desired residual pressure in the system between the delivery and nozzle valves after each injection takes place. The residual pressure must be low enough to prevent the pressure waves from attaining such an undesirable magnitude as would cause the nozzle valve to re-open or chatter, thereby causing secondary injections or dribbling or both. Much difficulty has been encountered in providing a completely satisfactory combination of these parts and particularly a delivery valve which will produce wholly suitable results throughout the full speed and load ranges of operation of present day engines. Those valves which have been designed to function ideally at full load or high speeds cause less satisfactory operation at low load or idling speed, particularly in more recent types of engines wherein the requirements at idling speeds are substantially the same as in older engines but wherein the requirements at maximum output have increased considerably because the maximum desired output is now much greater than previously and fuel pressures necessary to meet these increased output requirements have materially increased. This difficulty becomes more pronounced in so-called dual fuel engines which are capable of operating interchangeably on either liquid fuels or gaseous fuels. When the latter type fuel is employed as the main fuel, small quantities of liquid fuel are nevertheless injected into the combustion chamber for initiating combustion of the gaseous fuel mixture. This pre-injection of solid fuel to provide ignition is usually referred to as "pilot injection" and the quantity injected is called "pilot quantity." For good engine operation, it is important that the pilot injections be accurately timed because a fluctuation in timing may cause either late injection or detrimental pre-ignition. Additionally, the quantity of fuel required for idling operation is quite small in comparison to the quantity at full load operation, and the pilot quantity for gaseous fuel operation of a dual fuel engine is several times smaller than for idling during solid fuel operation. By reason of the smallness of the pilot quantities required, the necessity for accurate timing and the increased range (idling to full load) of operation of the more recent engines, the conventional fuel pump and delivery valve combinations heretofore known have not proved entirely satisfactory. The prior systems do not possess either the required operating characteristics to insure injection of regular or uniform quantities for small quantity injections or the ability to effect proper timing of the beginning of such injections throughout the full range of operation of the engine.

As briefly mentioned above, one of the chief functions of the delivery valve in a solid fuel injection system is to effect a suitable reduction of the pressure in the fuel column between the delivery and nozzle valves after each injection, this being effected in some cases by retracting or withdrawing a small amount of fuel from the delivery line while the delivery valve is closing and in other cases by providing for some retraction of the valve to thus increase the volume of the delivery line after communication between said line and the pump chamber is cut off. This pressure reduction should be sufficient to lower the maximum intensity of any pressure waves which occur in the line subsequent to the closing of the injection nozzle valve to a point below the pressure required to reopen the nozzle valve. Reopening of the nozzle valve and hence secondary injections or dribbling following a pilot or other proper injection is highly undesirable and to be avoided. It will be recognized that if the amount of the retraction and, hence, the residual pressure in the delivery line varies substantially, the timing of the beginning of injections will vary unduly and the percentage variation in the magnitude of pilot quantities injected will be substantial and undesirable. It will be recognized, too, that the amount of retraction or pressure reduction which is necessary and suitable at high speeds or full load operation will be excessive and detrimental for low speed or light load operations and especially so for pilot injection in dual fuel engines. Hence, a predetermined fixed or constant retraction at all speeds and loads is neither practical nor desirable, but attempts heretofore made to provide retraction which varies in a desirable manner have failed to provide any practical means capable of producing sufficiently constant results at low speed or pilot quantity operation while producing good results also at high speed or maximum output operation.

It is accordingly an object of the present invention to provide novel fuel injection apparatus which will overcome the foregoing difficulties and possess the above-mentioned desirable characteristics and advantages.

Another object is to provide in a fuel injection system a novel method of controlling the flow of fuel to assure desirable and efficient operation under all conditions throughout the full range of engine operation.

Another object of the invention is to provide novel valve means in a fuel injection system for controlling the residual pressure in the fuel delivery line following each injection of fuel and thereby provide accurate injection control.

Still another object is to provide fuel injection means which is novelly constructed and functions in a novel manner to insure delivery of desired quantities of fuel and accurate timing of the beginning of injections throughout the entire range of engine operation, i.e., from near zero fuel quantity for pilot injection to the maximum required for full load, high speed operation.

A further object is to provide novel means for injecting solid fuel into the combustion chamber of an engine which satisfy the peculiar requirements of so-called dual fuel engines.

Another object is to provide fuel injection apparatus of the above character which is structurally simple and practical as well as efficient in operation.

Still another object is to provide novel delivery valve means in a fuel injection system which is effective to control the residual delivery line pressure in accordance with the engine speed and load so that for all conditions of operation, the proper quantity of fuel will be injected without appreciable variation in the timing of the beginning of each injection in relation to the engine cycle.

A still further object is to provide delivery valve means in a fuel injection system which is so constructed as to combine both fixed and variable retraction features which effect satisfactory pressure reductions in the delivery line under all conditions of engine operation.

The above and further objects and novel features of the present invention will more fully appear from the following detail description when the same is read in connection with accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a side elevation view of one form of a fuel injection system as comprehended by the invention comprising a fuel pump, delivery line and injection nozzle and showing a partial section through the longitudinal axis of the pump-delivery valve combination.

Fig. 2 is a detail side elevation view on an enlarged scale showing the delivery valve member of the device of Fig. 1;

Fig. 3 is a view taken on line 3—3 of Fig. 1 but showing the valve member of Fig. 2 in full bottom view; and, Figs. 4 and 5 are transverse sectional views taken along the lines 4—4 and 5—5, respectively, of Fig. 2.

A single embodiment of the invention is shown in the accompanying drawings by way of example in combination with a reciprocating plunger type of fuel pump for injecting solid liquid fuel into the combustion chambers of an engine, such as the cylinders of an internal combustion engine. The features of the fuel pump, per se, form no part of the invention and accordingly, any of many known pump structures may be employed. The parts of the pump illustrated in Fig. 1 of the drawings comprise the hollow casing 10 in which the pump cylinder 11 is supported. In a manner well understood in the art, the pump plunger 12 is reciprocated in cylinder 11, such as by means of a rotating cam and spring means (not shown). Downward movement of the plunger creates a vacuum in pressure chamber 14 to induce the entrance of fuel through supply line 15, internal annular groove 16 in the casing and inlet ports 17. On the upward movement of the pump plunger after it has covered ports 17, fuel is forced out through the upper end of the cylinder until a helical groove 18 in the surface of the plunger moves into communication with by-pass port 19, thus releasing the pressure in chamber 14 through passages 20, 21 in the plunger, groove 18, port 19, and groove 16 in the casing which communicates with supply line 15 or other low pressure reservoir. Plunger 12 may be rotated in a known manner to vary the position of helical groove 18 relative to by-pass port 19 to thereby adjust the effective pumping stroke of the plunger and hence, the quantity of fuel delivered from chamber 14 during each pumping stroke in a manner well understood in the art.

Fuel flow from the upper end of pump cylinder 11 is controlled by a delivery valve assembly comprising a valve guide or adapter 23 and a valve member 24, the detail construction and operation of which will be hereinafter more fully described. Adapter 23 rests upon the end face of cylinder 11 and is secured within casing 10 by a gland member or fitting 25 which is in turn secured in place by a ring 26 fastened to casing 10 by a plurality of stud bolts 22. Member 25 is hollow and is adapted to connect at its upper or outer end with a conduit 9 for conducting fuel to a fuel injection nozzle 8 in an engine. Any of the many known injection nozzle constructions may be employed, such as, for example, the so-called closed type wherein flow from the pump to the nozzle spray orifices is controlled by a spring-pressed valve actuated to open position by the fuel pressure. The type of nozzle valve commonly known as the open or check valve type may also be used. In the following discussion, the fuel occupied volume within fitting 25, the delivery conduit 9 and the injection nozzle 8 between delivery valve 24 and the injection nozzle valve will be referred to as the delivery line.

Structures of the above character have long been used for supplying metered quantities of liquid fuel to the cylinders of diesel type engines wherein the fuel is ignited by the heat of compression in the cylinders. In some engines of this type it may also be desirable to use a gaseous fuel interchangeably with solid fuel. In these so-called dual fuel engines it is desirable to ignite the gaseous fuel charge by pumping into the engine cylinder or combustion chamber a small or pilot quantity of solid fuel oil. In the interest of simplicity and economy and other factors, it is desirable to utilize for pilot injection during gaseous fuel operation the same solid fuel injection apparatus that is used for supplying all of the fuel during the normal fuel oil operation. Much difficulty has been experienced in the past in providing a fuel injection system which will function in a desirable manner throughout the full range of engine operation, which range has been increased considerably without any compensating changes in fuel injection equipment. The requirements at full load when maximum quantities of fuel are being pumped differ from the requirements at idling when the fuel quantities are considerably less and the difference is directly proportional to the magnitude of the range of operation of the engine from idling to full load. Accordingly, prior structures which have functioned with reasonable satisfaction at full load have been considerably less satisfactory at idling speeds. This difficulty is still more pronounced in dual fuel engines inasmuch as the quantity of fuel in each "pilot injection" for gaseous fuel ignition is several times less than the normal minimum quantities injected during full fuel oil operation. In most engines the so-called pilot quantities are from $\frac{1}{4}$ to $\frac{1}{3}$ as large as idling quantities under full fuel oil operation. The problem is further enhanced by the necessity for accurate timing of the pilot injections to prevent either pre-ignition of the gaseous fuel mixtures or erratic ignition thereof, including failures to fire and irregular firing. It is generally known by those skilled in the art that a delivery valve with fixed retraction tends to produce highly irregular injections intermingled with complete misses at pilot oil quantity, because the residual line pressure becomes considerably lower than desirable at low fuel quantity and subject to much greater variation percentagewise. On the other hand, delivery valves with a variable retraction feature often produce nearly regular injections at low fuel quantity range but at the same time tend to advance the beginning of injection considerably, and this is contrary to the requirements for good gaseous fuel operation.

For overcoming the foregoing difficulties and attaining the desired results enumerated above, the present invention comprehends novel delivery valve means between the pump pressure chamber and the delivery line which functions in a novel manner to effectively control the residual pressure in the delivery line following each fuel injection, irrespective of the quantity of fuel pumped or frequency of injections. In the illustrated embodiment, the novel valve member 24 is provided at its lower end with a conical seat 30 adapted to engage a valve seat 31 in a reduced portion of the bore through valve adapter 23. A plurality of circumferentially spaced flutes 32 engage the walls of an enlarged portion of the adapter bore and guide the reciprocating movement of the valve member. At the upper end of the flutes 32 the valve member has a flow restricting collar 33 which completely fills the bore of the adapter except that the surface thereof has one or more flats 34 which, with the walls of the adapter, form one or more small passages 38 through which fuel may flow to and from the pump chamber when the valve 30, 31 is open. If desired, the passages 38 may be formed wholly within the body of the valve member 24. Spaced a short distance above piston portion 33 and surrounding but integral with a reduced part of valve member 24, is a piston portion or retraction collar 35 that also has a close sliding fit in the bore of the adapter or guide 23 when the valve is resting on seat 31. The upper end of the valve member, as viewed in the drawings, is adapted to engage a stop 36 to limit and thus fix the opening movement thereof against the residual pressure in the delivery line, friction, gravity and the efforts of a coil spring 37, the latter being optional in some installations. In any installation, spring 37 is of sufficiently light construction to permit the valve to move against stop 36 during each pumping stroke—even for pilot injections. It has been found that in most installations, the upward movement or lift of valve member 24 permitted by stop 36 is preferably two and one-half to five times greater than the axial length of that portion of the retraction collar 35 which enters the adapter bore when the valve is closed, but is insufficient to permit flow restricting collar 33, 34 from moving wholly out of the adapter bore. The proper lift for the valve in any given installation should be determined on the basis of operation to insure sufficient retraction, i.e., the residual pressure in the system must be lowered only sufficiently to prevent secondary injections at full speed and load. Any further reduction of residual pressure would tend to reduce the fuel delivery unnecessarily. Criterions used for closely estimating the optimum valve lift are: the total volume between the delivery valve and the nozzle valve, the permissible peak pressure, the length of fuel column and the character of pump plunger velocity. The flow restricting passages 38 formed by flats 34 or otherwise should have a total cross-sectional or flow area greater than the total flow area of the spray orifice or holes in fuel injection nozzle 8 through which fuel is pumped, but the relationship of these areas should preferably be no greater than about fourteen to one, the best ratio being dependent upon several factors, such as the total volume in the system subject to high pressure, the contour and speed of the pump actuating cam which determines the pump plunger mean velocity during the period of actual pumping, and other factors which differ in differently constructed systems. One criterion for determining a suitable transverse or flow area for passages 38 in any given installation is the mean velocity of the fuel through said passages on the pumping stroke when the engine is operating at full load. It has been determined that such velocity, which is dependent upon some of the factors mentioned above, should be in the approximate range of about 30 to 60 meters per second. The optimum valve lift and passage size may be readily determined by trial when the other structural features of the system have been fixed.

In operation, upward movement of pump plunger 12 beyond inlet port 17 creates a pressure in chamber 14 which effects movement of valve member 24 off its seat and into engagement with stop 36. Fuel can now flow through passages 38, thereby raising the pressure in the delivery line to a value sufficient to open the injection nozzle valve and permit fuel to flow through the nozzle orifices into the combustion chamber of the engine. The small passages 38 do not function in any restrictive sense during the pumping or injection stroke of the pump plunger since the flow area thereof is more than ample to freely pass the quantity of fuel which can be forced through the even smaller nozzle spray orifices. For sake of comparison, it can be mentioned that the mean velocity through the spray orifices in a modern diesel engine is normally somewhere between 250 and 450 meters per second at full load.

When the desired quantity of fuel has been pumped as required for pilot injection or as determined by the speed and load of the engine, metering groove 18 will move into communication with by-pass port 19, and the pressures in the pump chamber and delivery line immediately fall off. Inasmuch as port 19 opens rapidly, the initial pressure drop is greatest in chamber 14, the drop in the delivery line being retarded by restricted passages 38 and the prompt closing of the nozzle valve upon a reduction of pressure in the delivery line. This pressure differential, aided by spring 37 if one is provided, causes delivery valve 24 to move downwardly, as viewed in the drawing, toward closed position. As the valve member is thus forced back, and, hence, partially withdrawn from the delivery line space, the volume of the latter is increased and the pressure therein is correspondingly decreased. These factors, together with the upward inertia of the fuel, are believed to result in restricted but continued flow toward the delivery line from the pump during the closing movement of the valve 24 until retraction collar 35 begins to enter the bore of adapter 23. Inasmuch as communication between the delivery line and the pump chamber is cut off by entrance of retraction collar 35 into the adapter bore, any further movement of the valve toward closed position results in the withdrawal or retraction of a fixed and known volume of the valve from the delivery line and, hence, a substantially fixed or constant reduction in the residual pressure in the delivery line. A fixed retraction and hence, a constant pressure reduction, which is ideal at full load, high speed operation is not suitable at idling speeds and particularly not for pilot injection on dual fuel engines.

The quantity of fuel which flows from pump chamber 14 into the delivery line through passages 38 during the initial closing movement of valve 24 is dependent upon several factors including, among others, the flow area of the passages, the intensity of the pressure waves which usually increase with the quantity of the fuel pumped, the direction and fluctuations of the pressure waves, and the time available. Some of these factors vary with the operating conditions of the engine, so that when large quantities of fuel are being pumped for injection, the fuel which flows into the delivery line from the pump during the initial closing movement of the valve is less effective to replace the withdrawn or retracted volume of the valve member 24 than is the corresponding flow when smaller quantities of fuel are being pumped. To say it differently, the retraction and, hence, pressure reduction, in the delivery line, insofar as it is determined by flow through passages 38, is greater at full load, high speed operation than it is at idling or pilot injection operation. It is believed that this variation in so-called retraction and hence in the reduction of residual delivery line pressure may be explained as follows: At full load operation, when large quantities of fuel are pumped, the rebounding pressure wave which occurs in the delivery line upon closure of the injection nozzle valve is comparatively great or severe. This pressure wave has the effect of providing relatively great resistance to any continued flow from the pump chamber through passages 38 as the valve 24 moves toward closed position, and the further effect of closing the valve rapidly, thus limiting the time during which such continued flow can occur. It may be noted that the valve closing effort of spring 37, which exerts a pressure of about ten pounds per square inch, is negligible in comparison to the effort of the rebounding pressure wave which exerts a pressure of several thousand pounds per square inch. The magnitude of the pressure wave varies from a maximum at full load to a minimum at idling or pilot injection and the retraction or residual pressure varies accordingly. At idling, when relatively small quantities of fuel are pumped, the rebounding pressure wave is relatively low or mild and would hence offer less resistance to flow from the pump chamber through restricted passages 38. Also, the valve 24, which must move through the same closing distance under all conditions, will be closed more slowly, and passages 38 will remain open for a greater time interval. Accordingly, at no load or pilot injection, a greater proportion of the delivery line volume vacated by the closing valve is replaced by fuel from the pump chamber than is the case at full or partial load operation, so that the pressure reduction in said line varies from the least at no load to the greatest at full load operation. Generically speaking, this inherent variation is desirable, but it is not of the precise nature required to insure efficient operation through the full range of engine operation on straight fuel oil and is wholly ineffective to produce suitable results during pilot injection for gaseous fuel operation of dual fuel engines when proper adjustment has been made to provide satisfactory operation at full load. This difficulty is obviated by the present invention which provides supplemental fixed retraction means to insure a sufficient amount of effective retraction for maintaining a desirable level of residual line pressure at the lower fuel quantity range and also at lower speeds.

The present invention comprehends a novel combination of the variable retraction effect attained by the use of restrictive passages 38 and the fixed retraction effect produced by retraction collar 35. For any given fuel injection system, the collar 35 is preferably chosen and designed to produce very near the full amount of retraction or pressure reduction in the delivery line which provides the greatest efficiency and satisfaction when the pump is operating to deliver the small pilot and idling quantities required. The passages 38 are then made of such a size that the retraction effect thereof during maximum quantity injection will, when added to the fixed retraction effect of collar 35, produce efficient operation under full load, top speed operation on fuel oil. At pilot injection for gaseous fuel operation and at idling for fuel oil operation, the retraction effect resulting from restrictive passages 38, when the same are so designed, will be zero, or at least negligible so that the full retraction effect will be determined by collar 35. In this manner, uniformity of the "pilot quantity" and accurate timing of the "pilot injection" are assured.

For a structure of the type illustrated in the drawings, it has been determined that the volume of that portion of collar 35 which enters the bore of adapter 23, i.e., the fixed retraction volume, should be in the approximate range of 20% to 35% of the total effective volume vacated in the delivery line by the valve movement from full open to closed position, which is the cross sectional area of collar 35 times total valve lift. The volume of the groove, when one is provided between collars 33 and 35, is part of the delivery line volume effectively vacated by the closing of the valve, because the fuel within the groove moves with the valve into the adaptor bore as if it were a part of the valve. In one suitable embodiment wherein the pump plunger has a diameter of about 17 mm., the total retraction volume is 400 cubic millimeters and the fixed retraction volume is 100 cubic millimeters. In that same embodiment the total transverse area of passages 38 is about 6 square millimeters. In a system having a pump and valve of this type it is common to provide valve means in the injection nozzle 8 which opens under a pressure of about 3000 lbs. per square inch, and it is desirable to reduce the residual delivery line pressure after each injection to about 1000 or 1500 lbs. per square inch by retraction as above described. This reduction is brought about by providing a suitable increased volume by valve retraction to permit expansion of the fuel which is measurably compressed at the high injection pressures.

Although only a single embodiment of the invention is illustrated in the drawings and only a limited number of modifications thereof are described in the foregoing specification, it is to be expressly understood that the invention is not so limited. For example, the detail design of the pump and delivery valve are exemplary only and may be greatly varied. The shape and position of the passages 38 may be greatly varied and the number thereof may be increased or decreased if desired. Various other changes may also be made in the design and arrangement of parts illustrated without departing from the spirit and scope of the invention as the same will now be understood by those skilled in the art.

What is claimed is:

1. In fuel injection apparatus for internal combustion engines comprising an injection nozzle having valve means and discharge orifices, a high pressure fuel pump and means connecting said nozzle and pump including a delivery line, the combination of delivery valve means for controlling flow through said delivery line, said valve means comprising guide means having a bore therethrough communicating with the pressure chamber of the pump and a valve seat in said bore at the end thereof adjacent said chamber and a valve mounted to slide in said bore, said valve being adapted to engage said valve seat to close said bore and having an intermediate flow restricting portion and a close fitting retraction collar on the side of said flow restricting portion remote from said valve seat, said collar being adapted to be moved into said bore to close the latter to cut off flow therethrough and adapted to be moved out of said bore toward said delivery line to open the bore to flow past said flow restricting portion, the total transverse flow area of said nozzle orifices and the transverse flow area of the flow passage provided by said flow restricting portion being so related that said flow restricting portion is ineffective to restrict flow during an effective pumping stroke of the pump and effective to restrict maximum flow between the delivery line and the pump following each effective pumping stroke of the pump which is greater than that required at idling speed and pilot injection operation, and stop means for limiting the opening movement of said valve to maintain said flow restricting portion within said bore.

2. In fuel injection apparatus for internal combustion engines comprising an injection nozzle having valve means and discharge orifices, a high pressure fuel pump and means connecting said nozzle and pump including a delivery line, the combination of delivery valve means for controlling flow through said line, said delivery valve means comprising guide means having a bore therethrough communicating with the pressure chamber of the pump and a valve seat in said bore at the end thereof adjacent said chamber and a valve mounted to slide in said bore, said valve being adapted to engage said valve seat to close said bore and having an intermediate flow restricting portion and a close fitting retraction collar on the side of said flow restricting portion remote from said valve seat, the total transverse area of the flow passage provided by said flow restricting portion being greater but not more than about fourteen times greater than the total transverse flow area of said nozzle orifices and said collar being adapted to be moved into said bore to close the latter to cut off flow therethrough and adapted to be moved out of said bore toward said delivery line to open the bore to flow past said flow restricting portion, and stop means for limiting the opening movement of said valve to maintain said flow restricting portion within said bore 3. Fuel injection apparatus as defined in claim 1 comprising resilient means for normally maintaing the valve seated.

4. Fuel injection apparatus as defined in claim 1 wherein said valve is normally maintained seated by fluid pressure in the delivery line.

5. In fuel injection apparatus for internal combustion engines comprising an injection nozzle having valve means and discharge orifices, a high pressure fuel pump and means connecting said nozzle and pump including a delivery line, the combination of delivery valve means for controlling flow through said line, said delivery valve means comprising guide means having a bore therethrough communicating with the pressure chamber of the pump and a valve seat in said bore at the end thereof adjacent said chamber and a valve mounted to slide in said bore, said valve being adapted to engage said valve seat to close said bore and having an intermediate flow restricting portion and a close fitting retraction collar on the side of said flow restricting portion remote from said valve seat, said collar being adapted to be moved into said bore to close the latter to cut off flow therethrough and adapted to be moved out of said bore toward said delivery line to open the bore to flow past said flow restricting portion, and stop means for limiting the opening movement of said valve to maintain said flow restricting portion within said bore, the volume of that portion of said retraction collar which is within the bore when the valve is seated being within the range of about 20% to 35% of the effective volume vacated in the delivery line by that portion of the valve which is withdrawn from the delivery line into said bore when the valve moves from a position against said stop means to seated position on said valve seat.

6. Fuel injection apparatus as defined in claim 1 wherein the volume of that portion of said retraction collar which is within the bore when the valve is seated is within the range of about 20% to 35% of the product of the transverse area of said bore times the maximum valve lift when the valve moves from seated position on the valve seat to a position against said stop means.

7. In fuel injection apparatus wherein liquid fuel is pumped from a pressure chamber through a delivery line to an injection nozzle having discharge orifices, the combination of valve means for controlling flow between said chamber and line comprising guide means having a passage communicating with and connecting said chamber and line and a valve slidable in said passage, said valve being adapted to normally engage a seat in said guide means to cut off communication between said chamber and line and having a flow restricting portion and a retraction collar spaced by a reduced portion of the valve from said flow restricting portion at the side thereof remote from said seat, the total transverse area of the flow passage provided by said flow restricting portion being greater but not more than about fourteen times greater than the total transverse flow area of said nozzle orifices, and stop means for limiting the movement of said valve away from said seat to permit said collar to move out of said guide means without permitting said flow restricting portion to move out of said guide means.

8. In fuel injection apparatus wherein liquid fuel is pumped from a pressure chamber through a delivery line to an injection nozzle having discharge orifices, the combination of valve means for controlling flow between said chamber and line comprising guide means having a passage communicating with and connecting said chamber and line and a valve slidable in said passage, said valve being adapted to normally engage a seat in said guide means to cut off communication between said chamber and line and having a flow restricting portion and a retraction collar spaced by a reduced portion of the valve from said flow restricting portion at the side thereof remote from said seat, and stop means for limiting the movement of said valve away from said seat to permit said collar to move out of said guide means without permitting said flow restricting portion to move out of said guide means, the volume of that portion of said retraction collar which is within said passage when the valve is seated being less than about 35% of the total volume effectively vacated in the delivery line by the portion of the valve which is withdrawn from the delivery line into said passage when the valve moves from a position against said stop means to seated position in the guide means.

9. In fuel injection apparatus wherein liquid fuel is pumped from a pressure chamber through a delivery line to an injection nozzle having discharge orifices, the combination of valve means for controlling flow between said chamber and line comprising guide means having a passage communicating with and connecting said chamber and line and a valve slidable in said passage, said valve being adapted to normally engage a seat in said guide means to cut off communication between said chamber and line and having a flow restricting portion and a retraction collar spaced by a reduced portion of the valve from said flow restricting portion at the side thereof remote from said seat, the flow restricting portion of the valve providing a flow area greater than the smallest flow area through which the fuel is forced after passing said flow restricting portion during an effective pumping stroke of the pump but sufficiently small to restrict maximum flow under operating conditions prevailing after each effective pumping stroke of the pump except under idling speed and pilot injection operation, and stop means for limiting the movement of said valve away from said seat to permit said collar to move out of said guide means without permitting said flow restricting portion to move out of said guide means.

10. In a fuel injection system for an internal combustion engine, delivery valve means comprising an adapter having a cylindrical bore, and a valve slidable in said bore, said valve being engageable with a seat in said bore to close the latter and having a retraction collar adapted to close said bore and a flow restricting portion between said seat and collar, the valve being otherwise reduced in transverse section to permit relatively free flow in said bore, said flow restricting portion consisting of a second collar having a peripheral surface at least a major portion of which has close sliding engagement with the inner wall of said bore, and stop means for limiting the movement of the valve away from said seat to prevent movement of said flow restricting portion out of said bore while permitting movement of said retraction collar out of said bore.

11. In a fuel injection system, the method of controlling the flow of liquid fuel in a delivery line between the pressure chamber of a pump and an injection nozzle following each injection of fuel through the nozzle which comprises continuously restricting the flow passage between the delivery line and said chamber so as to permit a predetermined pressure drop in said line after each injection of fuel and before cutting off communication between said line and chamber, and thereafter further reducing the residual pressure in said line by enlarging the internal volume of the delivery line a predetermined fixed amount.

12. In fuel injection apparatus wherein liquid fuel is pumped from a pressure chamber through a delivery line to an injection nozzle having discharge orifices, the combination of valve means for controlling flow between said chamber and line comprising guide means having a passage communicating with and connecting said chamber and line and a valve slidable in said passage, said valve being adapted to normally engage a seat in said guide means to cut off communication between said chamber and line and having a flow restricting portion and a close fitting retraction collar adapted to be moved into said passage to close the latter to cut off flow therethrough and adapted to be moved out of said passage, said flow restricting portion being located between said chamber and said collar, and stop means for limiting the movement of said valve away from said seat to permit said collar to move out of said guide means to allow flow as permitted solely by said flow restricting portion between said chamber and line, the total transverse flow area of said nozzle orifices and the transverse flow area of the flow passage provided by said flow restricting portion being so related that said flow restricting portion is ineffective to restrict flow during an effective pumping stroke of the pump and effective to restrict maximum flow between the delivery line and the pump following each effective pumping stroke of the pump, said effectiveness being negligible at idling speed and pilot injection operation.

13. Fuel injection apparatus as defined in claim 12 wherein the volume of that portion of said retraction collar which is within said passage when the valve is seated is less than about 35% of the product of the transverse area of said passage in the plane of said collar times the linear movement of the valve when the same moves from seated position on the valve seat to a position against said stop means.

14. In a fuel injection system, the method of controlling the flow of liquid fuel in a delivery line between the pressure chamber of a pump and an injection nozzle following each injection of fuel through the nozzle which comprises continuously so restricting the flow passage between the delivery line and said chamber while enlarging the internal volume of the delivery line as to induce a pressure drop which will result in approximately a pre-determined residual pressure in said line after each injection of fuel at the time of the cutting off of communication between said line and chamber under substantially all operating conditions except idling and pilot injection operation, and thereafter further reducing the residual pressure in said line by enlarging the internal volume of said line a pre-determined fixed amount.

References Cited in the file of this patent

UNITED STATES PATENTS

| | | |
|---|---|---|
| 400,363 | Russ | Mar. 26, 1889 |
| 1,601,210 | Haas | Sept. 28, 1926 |
| 1,903,248 | Spence | Mar. 28, 1933 |
| 2,090,351 | Heinrich et al. | Aug. 17, 1937 |
| 2,090,688 | Lindberg | Aug. 24, 1937 |
| 2,163,313 | Voit | June 20, 1939 |
| 2,211,252 | Bremser | Aug. 13, 1940 |
| 2,234,932 | Schlaupitz | Mar. 11, 1941 |
| 2,279,010 | Nichols | Apr. 7, 1942 |
| 2,354,283 | St. Clair | July 25, 1944 |
| 2,804,825 | Mansfield et al. | Sept. 3, 1957 |

FOREIGN PATENTS

| | | |
|---|---|---|
| 455,778 | Great Britain | Oct. 27, 1936 |
| 513,349 | Great Britain | Oct. 10, 1939 |
| 540,616 | Great Britain | Oct. 23, 1941 |